United States Patent
Bushendorf et al.

(10) Patent No.: US 7,368,171 B2
(45) Date of Patent: May 6, 2008

(54) LAMINATING ADHESIVE, LAMINATE INCLUDING THE SAME, AND METHOD OF MAKING A LAMINATE

(75) Inventors: Paula T. Bushendorf, Woodbury, MN (US); Peter A. Voss, St. Paul, MN (US)

(73) Assignee: H.B. Fuller Licensing & Financing, Inc., St. Paul, MN (US)

( * ) Notice: Subject to any disclaimer, the term of this patent is extended or adjusted under 35 U.S.C. 154(b) by 336 days.

(21) Appl. No.: 10/934,266

(22) Filed: Sep. 3, 2004

(65) Prior Publication Data
US 2006/0052523 A1 Mar. 9, 2006

(51) Int. Cl.
B32B 27/40 (2006.01)
B05D 5/10 (2006.01)

(52) U.S. Cl. .................. 428/423.1; 428/423.5; 428/423.7; 428/424.8; 427/207.1; 427/519

(58) Field of Classification Search ............. 428/423.1, 428/423.5, 423.7, 424.8; 427/519, 207.1; 528/49, 75, 905
See application file for complete search history.

(56) References Cited

U.S. PATENT DOCUMENTS

| | | | |
|---|---|---|---|
| 4,284,731 A | | 8/1981 | Moser et al. |
| 4,297,185 A | * | 10/1981 | Chevreux et al. ............. 522/96 |
| 4,352,723 A | | 10/1982 | Morgan |
| 4,740,577 A | | 4/1988 | DeVoe et al. |
| 4,756,968 A | * | 7/1988 | Ebe et al. .................... 428/343 |
| 4,775,719 A | | 10/1988 | Markevka et al. |
| 4,914,173 A | * | 4/1990 | Ansell .......................... 528/49 |
| 5,013,631 A | | 5/1991 | Su |
| 5,021,507 A | | 6/1991 | Stanley et al. |
| 5,212,210 A | | 5/1993 | Halm |
| 5,478,427 A | | 12/1995 | Huver et al. |
| 5,494,960 A | | 2/1996 | Rolando et al. |
| 5,703,158 A | | 12/1997 | Duan et al. |
| 5,741,872 A | | 4/1998 | Smith |
| 5,900,457 A | | 5/1999 | Duan et al. |
| 6,017,998 A | | 1/2000 | Duan et al. |
| 6,074,755 A | | 6/2000 | Rasmussen et al. |
| 6,093,778 A | | 7/2000 | Pocius |
| 6,235,384 B1 | | 5/2001 | Voss et al. |
| 6,248,815 B1 | | 6/2001 | Papsin et al. |
| 6,274,674 B1 | | 8/2001 | Chang et al. |
| 6,334,710 B1 | | 1/2002 | Kuge et al. |
| 6,465,076 B2 | * | 10/2002 | Larson et al. ................ 428/143 |
| 6,482,869 B1 | | 11/2002 | Bolte et al. |

FOREIGN PATENT DOCUMENTS

| | | |
|---|---|---|
| EP | 0 108 630 A2 | 5/1984 |
| EP | 0 437 944 B1 | 7/1991 |
| EP | 0 646 632 A1 | 4/1995 |
| EP | 0 666 275 B1 | 8/1995 |
| EP | 0 801 086 A1 | 10/1997 |
| JP | 05 077862 A | 3/1993 |
| JP | 6-49429 | 2/1994 |
| WO | WO 98/33845 A | 8/1998 |
| WO | WO 98/53008 A1 | 11/1998 |
| WO | WO 99/23130 A1 | 5/1999 |
| WO | WO 01/02507 A1 | 1/2001 |
| WO | WO 01/05846 A1 | 1/2001 |
| WO | WO 02/34858 A | 5/2002 |

OTHER PUBLICATIONS

Shin et al., "Moisture-resistant anaerobic adhesive compositions," Chemical Abstracts, vol. 113, No. 10, Sep. 3, 1990, Columbus, Ohio, US, abstract No. 80112c; p. 85.
Shiraishi, Katsutoshi, "EB Curable Urethane Acrylate Oligomers For PSA", (1 page), date unknown.
Lapin, Stephen, "Electron Beam-Curable Laminating Adhesives For Flexible Packaging", RadTech Report, Jul./Aug. 2001, pp. 32 thru 35.
Bean, Anthony, "Energy Curing For Flexible Packaging", 1998 Polymers, Laminations & Coatings Conference, pp. 1049 thru 1055.
Henke, Gunter, "Electron-Beam Laminating Adhesives", (5 pages), date unknown.
Kobayashi, Masahide, "EB Curable Laminating Adhesives For Flexible Packaging", (pp. 362 thru 369), date unknown.

* cited by examiner

*Primary Examiner*—Thao Tran

(57) ABSTRACT

Disclosed is a method of making a laminate that includes a) preparing an adhesive composition, where the preparing includes combining a first part that includes (meth)acrylate functional, polyisocyanate prepolymer, and polyisocyanate monomer, the first part including at least 10% by weight isocyanate functional groups, and a second part that includes polyol, at least one of the first part and the second part includes photoinitiator, b) coating a first flexible substrate with the adhesive composition, c) exposing the adhesive composition to radiation to partially cure the adhesive composition, and d) contacting the adhesive composition with a second flexible substrate.

36 Claims, No Drawings

LAMINATING ADHESIVE, LAMINATE INCLUDING THE SAME, AND METHOD OF MAKING A LAMINATE

BACKGROUND

The invention relates to preparing dual cure laminating adhesives, and laminates including the same.

Flexible packaging materials are widely used in a variety of areas including food packaging. Flexible packaging is often constructed from film laminates in which a layer of laminating adhesive is disposed between a first film (e.g., a polyethylene terephthalate, polyamide or cellophane film) and a second film. Laminates are often used in food packaging because a desired film property cannot be achieved with a single layer or type of film. By combining films having different properties in the form of a laminate, a desired property or combination of properties can be achieved.

Laminates are typically constructed to have a strong cured bond that is resistant to delaminating stresses resulting from differences in modulus of the laminae, as well as to the added stresses imposed in the use of the laminate including exposure to heat, cold and humidity. Substrates used in food laminates often include metallized surfaces and/or have low surface tension, to which it is difficult to form a strong bond.

Various adhesives have been developed for use in preparing laminates including solvent based, water based, two component solventless adhesives, and radiation curable adhesives. Organic solvents such as methyl ethyl ketone, ethyl acetate, and alcohols, which are used in some laminating adhesives, tend to be flammable and may pose environmental concerns. Therefore it is desirable to use solventless laminating adhesives. Water-based laminating adhesives, which often include aqueous dispersions of polyurethane and other components, require the expenditure of heat to remove the water.

Because conventional two-component laminating adhesives often require storage for a prolonged period before exhibiting sufficient strength to permit handling and further processing, various efforts have been made to decrease the rate of cure for laminating adhesives. Areas in which recent efforts have been focused include electron beam and ultraviolet (UV) curable adhesive compositions. Although radiation curing can increase the rate of cure, processes that use such techniques do not always produce an adhesive and/or a laminate with suitable properties. Electron beam radiation, for example, can undesirably degrade the heat seal properties of certain films.

SUMMARY

In one aspect, the invention features a method of making a laminate that includes a) preparing an adhesive composition, where the preparing includes combining a first part that includes (meth)acrylate functional, polyisocyanate prepolymer, and polyisocyanate monomer, the first part including at least 10% by weight isocyanate functional groups, a second part that includes polyol, and optionally a third part, at least one of the first part, the second part and the optional third part including photoinitiator, b) coating a first flexible substrate with the adhesive composition, c) exposing the adhesive composition to radiation to partially cure the adhesive composition, and d) contacting the adhesive composition with a second flexible substrate.

In one embodiment, the first part includes at least 15% by weight the polyisocyanate monomer. In another embodiment, the first part includes at least 30% by weight the polyisocyanate monomer. In other embodiments, the exposing occurs prior to contacting the adhesive composition with the second flexible substrate. In some embodiments, the exposing occurs after contacting the adhesive composition with the second flexible substrate.

In another embodiment, the adhesive composition exhibits a viscosity of from 250 centipoise to 5000 centipoise at a temperature from 65° F. to 170° F.

In some embodiments, the coating includes coating the adhesive composition at a coating weight of from 0.5 pounds per 3000 square feet to 4 pounds per 3000 square feet.

In other embodiments, the adhesive composition exhibits a lap shear strength of at least 25 $g/in^2$ after exposure to the radiation. In one embodiment, the adhesive composition exhibits a lap shear strength of at least 100 $g/in^2$ after exposure to the radiation.

In other embodiments, the adhesive composition includes from 5% by weight to 70% by weight the (meth)acrylate functional, polyisocyanate prepolymer, at least 7% by weight the polyisocyanate monomer, from 30% by weight to 95% by weight the polyol, and from 0.2% by weight to 10% by weight the photoinitiator. In another embodiment, the first part of the adhesive composition includes from 40% by weight to 90% by weight the (meth)acrylate functional, polyisocyanate prepolymer, and from 10% by weight to 60% by weight the polyisocyanate monomer. In some embodiments, the first part of the adhesive composition includes from 10% by weight to about 20% by weight isocyanate functional groups. In other embodiments, the first part includes from about 0.5% by weight to about 20% by weight radiation polymerizable groups. In one embodiment, the first part includes from about 1% by weight to about 10% by weight radiation polymerizable groups.

In another embodiments, the first part and the second part are combined in amounts such that the stoichiometric ratio of isocyanate (NCO) to hydroxyl group (OH) (NCO:OH) is from about 1:1 to about 2:1.

In some embodiments, the (meth)acrylate polyisocyanate prepolymer includes the reaction product of a) an isocyanate polyurethane prepolymer includes the reaction product of i) polyol and ii) isocyanate, and b) hydroxy functional (meth)acrylate. In one embodiment, the hydroxy functional acrylate includes hydroxyalkyl (meth)acrylate. In another embodiment, the hydroxy functional acrylate includes hydroxyethyl acrylate.

In other embodiments, the polyol includes polyester polyol, polyether polyol, or a mixture thereof. In one embodiment, the polyol has a functionality of at least 2. In other embodiments, the polyol has a functionality of no greater than 3.

In some embodiments, the adhesive composition includes from 20% by weight to 95% by weight polyol. In another embodiment, the adhesive composition includes from 30% by weight to 70% by weight polyol.

In other embodiments, the adhesive composition includes from 30% by weight to 70% by weight the (meth)acrylate functional, polyisocyanate prepolymer. In some embodiments, the adhesive composition includes from 20% by weight to 60% by weight the (meth)acrylate functional, polyisocyanate prepolymer.

In one embodiment, the photoinitiator is selected from the group consisting of dialkoxy acetophenones, hydroxyalkyl phenyl ketones, benzoin ethers, benzoin acetals, acyl phosphine oxides, and combinations thereof. In another embodiment, the photoinitiator includes a hydroxyl functional photoinitiator.

In one embodiment, at least one of the first and second flexible substrates is a polymer film. In some embodiments, at least one of the first and second flexible substrates is a metal foil.

In other embodiments, at least one of the first flexible substrate and the second flexible substrate includes polyethylene terephthalate, polypropylene, polyethylene, metallized polypropylene, metalized polyethylene terephthalate, Nylon, and metal foil.

In one embodiment, the method of making a laminate includes a) coating a first flexible substrate with an adhesive composition that includes (meth)acrylate functional, polyisocyanate prepolymer, at least 7% by weight polyisocyanate monomer, polyol, and photoinitiator, b) exposing the adhesive composition to radiation to partially cure the adhesive composition, and c) contacting the adhesive composition with a second flexible substrate.

In another embodiment, the method of making a laminate includes a) preparing an adhesive composition, the preparing includes combining a first part that includes (meth)acrylate functional, polyisocyanate prepolymer, and at least 15% by weight polyisocyanate monomer, and a second part that includes polyol, at least one of the first part and the second part includes photoinitiator, b) coating a first flexible substrate with the adhesive composition c) exposing the composition to radiation to partially cure the composition, and d) contacting the adhesive composition with a second flexible substrate.

In other embodiments, the method of making a laminate includes a) preparing an adhesive composition, the preparing includes combining (meth)acrylate functional, polyisocyanate prepolymer, polyisocyanate monomer, the combination of the prepolymer and the monomer including at least 10% by weight isocyanate functional groups based on the combined weight of the prepolymer and the polyisocyanate monomer, polyol, and photoinitiator, b) coating a first flexible substrate with the adhesive composition, c) exposing the adhesive composition to radiation to partially cure the adhesive composition, and d) contacting the adhesive composition with a second flexible substrate.

In another aspect, the invention features a laminate that includes an adhesive composition that includes the reaction product of (meth)acrylate functional, polyisocyanate prepolymer, polyisocyanate monomer, the combination of the prepolymer and the monomer including at least 10% by weight isocyanate functional groups based on the combined weight of the prepolymer and the polyisocyanate monomer, polyol, and photoinitiator, a first flexible substrate, and a second flexible substrate, the first flexible substrate being bonded to the flexible substrate through the adhesive composition.

In one embodiment, the laminate includes an adhesive composition that includes the reaction product of a (meth)acrylate functional, polyisocyanate prepolymer, polyisocyanate monomer, polyol, and photoinitiator, a first flexible substrate, and a second flexible substrate, the first flexible substrate being bonded to the second flexible substrate through the adhesive composition, the adhesive composition exhibiting a destructive peel to at least one of the first and second substrates.

In other aspects, the invention features a package that includes a) a food article, and b) a laminate described herein at least partially surrounding the food article.

The invention features a method of making a laminate in which the adhesive of the laminate exhibits sufficient green strength to permit handling and further processing prior to being fully cured. The invention also features a method of making a food laminate in which the adhesive of the laminate exhibits a faster rate of cure relative to existing two-component food laminating adhesives. As a result, the period of storage required before the laminate can be used is decreased relative to manufacturing processes that use existing food laminate adhesives. In addition, because the laminate may undergo further processing relatively soon after it has been prepared, the storage requirements associated with the laminate are reduced relative to those requirements for existing two component food laminate adhesives. The relatively fast rate of cure of the adhesive also decreases, and can prevent, adhesive from seeping through pinholes in the film layers and smearing of the ink present on one or more of the film layers of the laminate. The adhesive composition also has a viscosity at the coating temperature that provides good wet out onto various substrates used in laminates.

The adhesive composition also exhibits good adhesion to difficult to adhere to substrates including, e.g., metallized substrates and substrates that exhibit low surface tension, i.e., a surface tension less than 34 dynes/$cm^2$.

Other features and advantages will be apparent from the following description of the preferred embodiments and from the claims.

GLOSSARY

In reference to the invention, these terms have the meanings set forth below:

The term "(meth)acrylate" refers to acrylate, methacrylate, and mixtures thereof.

The term "dual cure" refers to a composition that cures through two different mechanisms, e.g., radiation and a reaction between isocyanate functional group(s) and hydroxyl group(s).

DETAILED DESCRIPTION

The method of making the laminate includes coating a first flexible film substrate with an adhesive composition that includes a 100% solids two part dual cure composition, exposing the coated composition to radiation, and contacting the adhesive composition with a second flexible film substrate. Exposing the adhesive composition to radiation can occur before, during, or after, and combinations thereof, contacting the adhesive with the second flexible film substrate. The adhesive composition can be directly exposed to radiation or exposed to radiation through at least one of the substrates, where the substrate is sufficiently transparent to ultraviolet radiation. Exposing the adhesive composition to radiation initiates free radical polymerization of the radiation curable functional groups present in the composition, which imparts initial adhesive properties, e.g., green strength, to the laminate. A relatively slower reaction involving the isocyanate groups and the hydroxyl groups present in the composition also occurs over time and provides the final performance properties of the adhesive composition and a laminate constructed therewith. Without wishing to be bound by theory, the present inventors believe that the presence of the unsaturation, and the initiation of free radical cure, speed the rate of cure that occurs between the isocyanate and hydroxyl groups.

The adhesive composition is a dual cure adhesive composition that includes a first part, Part A, which includes a radiation polymerizable polyisocyanate prepolymer and polyisocyanate monomer, and a second part, Part B, which includes polyol. The adhesive composition also includes photoinitiator, which may be present in Part A, Part B, or a combination thereof. Alternatively, the photoinitiator may be provided to the composition separate from Part A and Part B. Part A and Part B of the composition are preferably combined to achieve a stoichiometric ratio of isocyanate (NCO) to hydroxyl group (OH) (i.e., NCO:OH) of from about 1:1 to 2:1, from 1.2:1 to 1.6:1, or even about 1.4:1. Part A and Part B are preferably combined in amounts such that, prior to cure, the composition includes at least about 5% by weight, at least about 30% by weight, at least about 50% by weight, at least about 60% by weight, no greater than about 80% by weight, or even no greater than about 70% by weight radiation polymerizable polyisocyanate prepolymer, at least 5% by weight, at least 10% by weight, no greater than about 50% by weight, no greater than about 40% by weight, or even no greater than about 30% by weight polyisocyanate monomer, at least about 20% by weight, at least about 30% by weight, no greater than about 90% by weight, or even no greater than about 70% by weight polyol, and from 0.2% by weight to about 10% by weight, or even from 0.5% by weight to 1% by weight photoinitiator.

Parts A and B of the composition are combined with mixing prior to coating. When Part A and Part B are combined, the composition preferably has a viscosity of from 250 centipoise to 5000 centipoise at a temperature from 65° F. to 170° F. The two parts of the dual cure composition then react with each other over time forming crosslinks. The rate at which this reaction occurs impacts the pot life, i.e., the period during which the composition can be coated and used for its intended purpose, of the dual cure composition. Preferably the dual cure composition exhibits a pot life of at least 30 minutes, or even at least 45 minutes. As indicated above, the adhesive composition continues to cure over time through the reaction of the isocyanate groups of the prepolymer of Part A and the hydroxyl groups of the polyol of Part B.

The adhesive composition, upon exposure to radiation, preferably exhibits a green strength suitable to permit handling and subsequent processing of the laminate. One useful method of measuring green strength is lap shear. Preferably the adhesive composition exhibits a lap shear of at least 25 grams/square inch (g/in$^2$), at least 100 g/in$^2$, at least 500 g/in$^2$, at least about 600 g/in$^2$, or even at least about 800 g/in$^2$, and a probe tack of at least 20 g/in$^2$, at least about 25 g/in$^2$, or even at least about 30 g/in$^2$ after exposure to ultraviolet radiation. The cured adhesive composition also preferably exhibits a peel force of at least 25 g/lineal inch, or even a destructive bond to the substrate to which it is bonded.

Part A

The first part, Part A, of the dual cure composition includes the radiation polymerizable polyisocyanate prepolymer (preferably a (meth)acrylate functional, polyisocyanate prepolymer) and polyisocyanate monomer. Part A preferably includes from at least about 40% by weight, at least about 50% by weight, at least about 60% by weight, no greater than about 90% by weight, or even no greater than about 80% by weight radiation polymerizable polyisocyanate prepolymer, and at least about 10% by weight, at least 15% by weight, at least 20% by weight, at least 30% by weight, at least 40% by weight, no greater than 60% by weight, or even no greater than 50% by weight polyisocyanate monomer.

Radiation Polymerizable Polyisocyanate Prepolymer

The radiation polymerizable, polyisocyanate prepolymer includes radiation curable functional groups and isocyanate functional groups. The functional groups are located pendant, terminal or a combination thereof on the prepolymer. Preferably the functional groups are located terminally on the prepolymer, i.e., the prepolymer is end capped with functional groups. The radiation polymerizable, polyisocyanate prepolymer preferably includes at least about 5% by weight, at least about 10% by weight, no greater than about 20% by weight, or no greater than about 18% by weight isocyanate functional groups, and an amount of radiation polymerizable functional groups sufficient to provide a composition that, upon exposure to radiation, exhibits a green strength suitable for subsequent processing.

The ratio of the equivalents of radiation polymerizable functional groups to isocyanate groups in Part A preferably is from 0.1:1 to about 5:1, from 0.5:1 to about 4:1, from 0.6:1 to about 3:1, or even about 1:1. The average functionality of the radiation polymerizable, polyisocyanate prepolymer is preferably at least about 1.8, about 2, no greater than 8, or even no greater than about 4, and the number average molecular weight of the radiation polymerizable, polyisocyanate prepolymer is preferably from about 200 to about 10,000, from about 400 to about 50,000, or even from about 600 to about 2,000.

The radiation polymerizable, polyisocyanate prepolymer is preferably prepared by reacting a compound that includes an active hydrogen and a radiation polymerizable functional group with a polyisocyanate prepolymer, preferably in the presence of excess isocyanate. Preferably the compound that includes an active hydrogen and a radiation polymerizable functional group is reacted with the isocyanate functional prepolymer in an amount such that from about 10% to about 80%, from about 20% to about 70%, or even from about 30% to about 60% of the isocyanate groups on the isocyanate functional prepolymer are replaced with the compound that includes the active hydrogen and the radiation polymerizable functional group.

The term "active hydrogen" refers to the active hydrogen on hydroxyl, amine, and mercapto functional groups.

Examples of radiation polymerizable functional groups include acrylate, methacrylate, akenyl groups (e.g., vinyl, allyl, and hexenyl), vinyl ethers, vinyl esters, vinyl amides, maleate esters, fumarate esters, and styrene functional groups and combinations thereof.

Suitable compounds that include an active hydrogen and a radiation polymerizable functional group include, e.g., hydroxyalkyl acrylates and methacrylates (e.g., 2-hydroxyethylacrylate (HEA), 2-hydroxyethylmethylacrylate (HEMA), 2-hydroxypropylacrylate, 3-hydroxypropylacrylate (HPA) and 2-hydroxypropyl methacrylate, 3-hydroxypropyl methacrylate, 1,3-dihidroxypropylacrylate and 2,3-dihidroxypropylacrylate and methacrylate, 2-hydroxyethylacrylamide and methacrylamide, 2-hydroxybutyl(meth)acrylate, 4-hydroxybutyl(meth)acrylate, 2-hydroxy-3-phenyloxypropyl(meth)acrylate, 1,4-butanediol mono(meth)acrylate, 2-hydroxy alkyl(meth)acryloyl phosphates, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate; N-alkyl-N-hydroxyethylacrylamides and methacrylamides, hydroxyethyl-betacarboxyethylacrylate, hydroxyhexyl acrylate, and hydroxyoctyl methacrylate and mixtures thereof.

Useful hydroxyethylacrylates and hydroxypropylacrylates are commercially available from Dow Chemical (Midland Mich.) and Osaka Organic Chemical Industry Ltd. (Osaka, Japan). Useful hydroxybutyl acrylates are commercially available from Osaka Organic Chemical Industry Ltd.

Useful hydroxy polyester acrylates are commercially available under the TONE MONOMER M-100 trade designation from Dow Chemical Company and VISCOAT 2308 from Osaka Organic Chemical Industry Ltd. Useful hydroxy polyether acrylates are commercially available under the ARCOL R-2731 trade designation from Bayer Chemicals (Pittsburgh, Pa.).

The polyisocyanate prepolymer is the reaction product of a polyisocyanate, and a polyol having a molecular weight of at least 500 g/mole, at least 1000 g/mole, no greater than 4000 g/mole, or even no greater than 2000 g/mole. The amount of polyisocyanate and polyol in the reaction mixture is such that the ratio of isocyanate to hydroxyl groups is at least 2:1. The resulting polyisocyanate prepolymer is free of hydroxyl groups and has a molecular weight of at least 500 g/mole, at least 1000 g/mole, or even no greater than 6000 g/mole.

Polyisocyanates useful in the preparation of the polyisocyanate prepolymer have at least two isocyanate groups and include, e.g., aliphatic, cycloplaliphatic, araliphatic, arylalkyl, alkylaryl, and aromatic isocyanates, and mixtures thereof, diisocyanates, triisocyanates, tetraisocyanates, and mixtures thereof.

Useful aromatic polyisocyanates include, e.g., diphenylmethane diisocyanate compounds (MDI) including its isomers, carbodiimide modified MDI, diphenylmethane 4,4'-diisocyanate, diphenylmethane 2,2'-diisocyanate, diphenylmethane 2,4'-diisocyanate, oligomeric methylene isocyanates having the formula

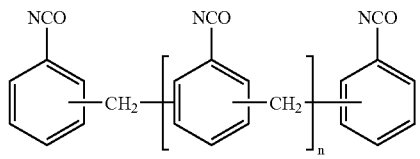

where n is an integer of from 2 to 5, and mixtures thereof; toluene diisocyanate (TDI) including the isomers thereof, isomers of naphthalene diisocyanate, isomers of triphenylmethane triisocyanate, and mixtures thereof.

Other suitable diisocyanates include, e.g., 1,3-cyclopentane diisocyanate, 1,4-cyclohexane diisocyanate, 1,3-cyclohexane diisocyanate, hydrogenated MDI (i.e., dicyclohexylmethane diisocyanate, $H_{12}$-MDI), methyl 2,4-cyclohexanediisocyanate, methyl 2,6-cyclohexanediisocyanate, 1,4-bis(isocyanatomethyl)cyclohexane, 1,3-bis(isocyanatomethyl)cyclohexane, 4,4'-diphenyl diisocyanate, 4,4'-toluidine diisocyanate, dianilidine diisocyanate, 4,4'-diphenyl ether diisocyanate, 1,3-xylylene diisocyanate including 1,3-diisocyanato-o-xylene, 1,3-diisocyanato-p-xylene and 1,3-diisocyanato-m-xylene, 1,4-xylylene diisocyanate, omega,omega'-diisocyanato-1,4-diethylbenzene, isomers of tetramethylxylylene diisocyanate, dialkyldiphenylmethane diisocyanates, tetraalkyldiphenylmethane diisocyanates, 4,4'-dibenzyl diisocyanate, 1,3-phenylene diisocyanate, 1,4-phenylene diisocyanate and mixtures thereof.

Examples of additional suitable diisocyanates include 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyanatoctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl)sulfide, 2,4-diisocyanto-1-chlorobenzene, 2,4-diisocyanato-1-nitrobenzene, 2,5-diisocyanato-1-nitrobenzene, m-phenylene diisocyanate, 1-methoxy-2,4-phenylene diisocyanate, 1-methoxy-2,4-phenylene diisocyanate, 3,3'-dimethyl-4,4'-diphenylmethane diisocyanate, 1-methyl-2,4-diisocyanatocyclohexane, 1,6-diisocyanato-2,2,4-trimethylhexane, 1,6-di-isocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane-1,4-diisocyanate, bisisocyanatoethyl phthalate; polyisocyanates containing reactive halogen atoms (e.g., 1-chloromethylphenyl-2,4-diisocyanate, 1-bromoethylphenyl-2,6-diisocyanate, and 3,3-bischloromethyl ether-4,4'-diphenyldiisocyanate); sulfur-containing polyisocyanates; dimeric fatty acid diisocyanates, and combinations thereof. Particularly preferred diisocyanates include 2,4'-methylene diphenyl diisocyanate and 4,4-methylene diphenyl diisocyanate.

Examples of suitable triisocyanates include 4,4',4"-triphenylmethane triisocyanate and 2,4,6-toluene triisocyanate. One example of a tetraisocyanates is 4,4'-dimethyl-2,2'-5,5'-diphenylmethane tetraisocyanate. Another suitable isocyanate is polymethylene polyphenylene polyisocyanate.

Other useful isocyanates are disclosed in, e.g., U.S. Pat. Nos. 6,387,449, 6,355,317, 6,221,978, 4,820,368, 4,808,255, 4,775,719, and 4,352,858, and incorporated herein.

Useful commercially available aromatic isocyanates include, e.g., aromatic isocyanates available under the trade designations MONDUR ML from Bayer Chemicals (Pittsburgh, Pa.), ISONATE 50 OP and ISONATE 125M from Dow Chemical Company (Midland, Mich.), and LUPRANATE MI from BASF (Germany).

The polyol used in the formation of the polyisocyanate prepolymer has at least two hydroxyl (OH) groups and a number average molecular weight of at least 500 g/mole, at least about 1000 g/mole, no greater than 4000 g/mole, no greater than about 2000 g/mole, from 500 g/mole to about 2000 g/mole, or even from 500 g/mole to about 1000 g/mole. Such polyols include polyester polyols, polyether polyols, polycarbonates and polyacetals.

Polyester polyols can be prepared by polycondensation of acid and/or anhydride with at least one alcohol, e.g., polycondensation of polycarboxylic acid or anhydride and polyol. Suitable polycarboxylic acids for use in preparing polyester polyols include, e.g., aliphatic, cycloaliphatic, araliphatic, aromatic and heterocyclic polycarboxylic acids and anhydrides. Examples of such polycarboxylic acids and anhydrides include succinic acid, adipic acid, suberic acid, azelaic acid, sebacic acid, cyclohexanediacid, glutaric acid, phthalic acid, isophthalic acid, terephthalic acid, trimellitic acid, phthalic anhydride, tetrahydrophthalic anhydride, hexahydro-phthalic anhydride, tetrachlorophthalic anhydride, endomethylenetetrahydrophthalic anhydride, glutaric anhydride, maleic acid, maleic anhydride, fumaric acid, dimeric fatty acids, trimeric fatty acid, trimellitic acid, trimellitic anhydride, and combinations thereof.

Useful polyols for preparing polyester polyols include aliphatic polyols (e.g., neopentylglycol, ethylene glycol, 1,2-propanediol, 1,3-propanediol, 1,4-butanediol, 1,3-butanediol, 2,3-butanediol, 1,4-butenediol, 1,4-butynediol, 1,5-pentanediol, 1,6-hexanediol, hexenediols, hexynediols, 1,7-heptanediol, heptenediols, heptynediols, 1,8-octanediol, octenediols, and octynediols), cyclohexane dimethanol, glycerol, trimethylolpropane, pentaerythritol, sorbitol, and glucose, and mixtures thereof.

Useful polyether polyols include the reaction product of polyols and polyalkylene oxides. Useful polyols for preparing polyether polyols include ethylene glycol, propylene glycol, butanediols, hexanediols, glycerols, trimethylolethane, trimethylolpropane, and pentaerythritol, and mixtures thereof. Useful alkylene oxides for preparing polyether polyols include ethylene oxide, propylene oxide and butylenes oxide and mixtures thereof.

Polyisocyanate Monomer

Part A also includes excess polyisocyanate monomer. Excess polyisocyanate monomer is preferably present in the adhesive composition an amount sufficient to achieve an adhesive composition that exhibits a destructive peel when tested according to the Peel Adhesion Test Method. Suitable polyisocyanate monomers include the polyisocyanates set forth above and incorporated herein.

Part B

The second part, Part B, of the dual cure composition includes polyol, and preferably photoinitiator. Part B preferably includes from about 70% by weight to about 100% by weight, from about 80% by weight to about 100% by weight, or even from about 90% by weight to about 100% by weight of the polyol, and from 0% by weight to about 10% by weight, from 0.2% by weight to about 5% by weight, or even from 0.5% by weight to 1% by weight photoinitiator.

Polyol

Suitable polyols for Part B, as well as for use in the preparation of the polyisocyanate prepolymer described above, include, e.g., diols, triols and mixtures thereof. Preferred polyols include polyester polyols, polyether polyols, polyolefin diols, polydiene block polyols, and combinations thereof. Preferred polyols have a functionality of at least about 1.5, at least about 2, at least about 3, no greater than 4.0, no greater than 3.5. Preferred polyols have a Tg less than 10° C., or even less than 0° C., and a number average molecular weight of at least about 500 g/mole to about 5000 g/mole, or even from about 750 g/mole to about 2000 g/mole.

Useful classes of polyols include, e.g., polyester polyols including, e.g., lactone polyols and the alkyleneoxide adducts thereof, and dimer acid-based polyester polyols, specialty polyols including, e.g., polybutadiene polyols, hydrogenated polybutadiene polyols, polycarbonate polyols, hydroxy alkyl derivatives of bisphenol A (e.g., bis(2-hydroxyethyl)bisphenol A), polyether polyols including, e.g., polythioether polyols, and fluorinated polyether polyols, acrylic polyols, alkylene oxide adducts of polyphenols, polytetramethylene glycols, functional glycerides (e.g., castor oil), and polyhdroxy sulfide polymers.

Useful polyester polyols are prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydrophthalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, and fumaric acid), and alicyclic dicarboxylic acids (e.g. 1,3-cyclohexanedicarboxylic acid, and 1,4-cyclohexanedicarboxylic acid).

Examples of suitable polyols from which polyester polyols can be derived include aliphatic polyols, e.g., ethylene glycols, propane diols (e.g., 1,2-propanediol and 1,3-propanediol), butane diols (e.g., 1,3-butanediol, 1,4-butanediol, and 1,7-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentylglycol, 1,4-cyclohexanedimethanol, 1,4-cyclohexanediol, dimer diols, bisphenol A, bisphenol F, hydrogenated bisphenol A, hydrogenated bisphenol F, glycerol, tetramethylene glycol, polytetramethylene glycol, 3-methyl-1,5-pentanediol, 1,9-nonanediol, 2-methyl-1,8-octanediol, and trimethylolpropane, pentaerythritol, sorbitol, glucose, and combinations thereof.

Examples of useful polyester polyols include polyglycol adipates, polyethylene terephthalate polyols, polycaprolactone polyols and polycaprolactone triols.

Suitable commercially available polyols include, e.g., polyester polyols available under the DESMOPHEN series of trade designations including, e.g., DESMOPHEN XF-7395-200, DESMOPHEN S-1011-P-210, DESMOPHEN S-1011-110 and DESMOPHEN S-1011-55 from Bayer Chemicals (Pittsburgh, Pa.), dimer acid-based polyester polyols available under the PRIPLAST series of trade designations including, e.g., PRIPLAST 3187, 3190, 3196, and 3197 from UNIQEMA (New Castle, Del.), polybutadiene polyols available under the trade designations POLYBD R-20LM, R-45HT, and R-45M from Atofina Chemicals, Inc. (Exton, Pa.), and hydrogenated polybutadiene polyols available under the trade designation POLYTAIL from Mitsubishi Chemical Corp. (Japan).

Suitable polyether polyols include the products obtained from the polymerization of a cyclic oxide, e.g., ethylene oxide, propylene oxide, butylene oxide, and tetrahydrofuran, or by the addition of one or more such oxides to polyfunctional initiators having at least two active hydrogens, e.g., water, polyhydric alcohols (e.g., ethylene glycol, propylene glycol, diethylene glycol, cyclohexane dimethanol, glycerol, trimethylol-propane, pentaerythritol and Bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and triols obtained by the simultaneous or sequential addition of ethylene oxide and propylene oxide to appropriate initiators and polytetramethylene ether glycols obtained by the polymerization of tetrahydrofuran.

Photoinitiator

The composition also includes photoinitiator. Photoinitiator can be present in any part of the composition including, e.g., Part A, Part B, and Part C, added as a separate component, and combinations thereof. Preferred photoinitiators are capable of promoting free radical polymerization, crosslinking, or both, of the ethylenically unsaturated moiety on exposure to radiation of a suitable wavelength and intensity. The photoinitiator can be used alone, or in combination with a suitable donor compound or a suitable coinitiator. The photoinitiator and the amount thereof are preferably selected to achieve a uniform reaction conversion, as a function of the thickness of the composition being cured, as well as a sufficiently high degree of total conversion so as to achieve the desired initial handling strength (i.e., green strength).

Useful photoinitiators include, e.g., "alpha cleavage type" photoinitiators including, e.g., benzoin, benzoin acetals (e.g., benzyl dimethyl ketal), benzoin ethers (e.g., benzoin ethyl ether, benzoin isopropyl ether, and benzoin isobutyl ether), hydroxy alkyl phenyl ketones (e.g., 1-hydroxycyclohexyl phenyl ketone, 2-hydroxy-2-methyl-1-phenylpropan-1-one, and 1-(4-isopropylphenyl)-2-hydroxy-2-methylpropan-1-one), benzoyl cyclohexanol, dialkoxy acetophenone derivatives (e.g., 2,2-diethoxyacetophenone), acylphosphine oxides (e.g., bis(2,4,6-trimethylbenzoyl)-phenylphosphine oxide, bis(2,6-dimethoxybenzoyl)-(2,4,4-trimethylpentyl) phosphine oxide, and 2,4,4-trimethylbenzoyl diphenylphosphine oxide), methyl thio phenyl morpholino ketones (e.g., 2-methyl-1-4(methylthio) and phenyl-2-morpholino-1-propanone), and morpholino phenyl amino ketones; hydrogen abstracting photoinitiators, which include a photoinitiator and a coinitiator, based on benzophenones, thioxanthones, benzyls, camphorquinones, and ketocoumarins; and combinations thereof. Preferred photoinitiators include acylphosphine oxides including, e.g., bis(2,4,6-trimethylbenzoyl)-phenylphosphine oxide, bis(2,6-dimethoxybenzoyl)-(2,4,4-trimethylpentyl)phosphine oxide, and 2,4,4-trimethylbenzoyl diphenylphosphine oxide.

Other suitable photoinitiators include, e.g., organic peroxides, azo compounds, quinones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof.

Useful commercially available photoinitiators are available under the following trade designations IRGACURE 369 morpholino phenyl amino ketone, IRGACURE 819 bis(2,4,6-trimethylbenzoyl)-phenylphosphine oxide, IRGACURE CGI 403 bis(2,6-dimethoxybenzoyl)-(2,4,4-trimethylpentyl)phosphine oxide, IRGACURE 651 benzyl dimethyl ketal, IRGACURE 184 1-hydroxycyclohexyl phenyl ketone, and IRGACURE 2959 4-(2-hydroxyethoxy)phenyl-(2-hydroxy-2-methylpropyl)ketone, DAROCUR 1173 2-hydroxy-2-methyl-1-phenyl-propan-1-one, which is also known as hydroxymethylphenylpropanone, DAROCUR 4265 50:50 blend of 2-hydroxy-2-methyl-1-phenylpropan-1-one and 2,4,6-trimethylbenzoyldiphenylphosphine oxide, and CGI1700 25:75 blend of bis(2,6-dimethoxybenzoyl)-2,4,4-trimethylpentylphosphine and 2-hydroxy-2-methyl-1-phenylpropan-1-one, all of which are available from Ciba Specialty Chemicals (Ardsley, N.Y.)

The photoinitiator is preferably present in an amount sufficient to provide the desired rate of photopolymerization. The amount will depend, in part, on the light source, the thickness of the layer to be exposed to radiant energy and the extinction coefficient of the photoinitiator at the wavelength. Typically, the photoinitiator component will be present in an amount of at least about 0.01% by weight, at least about 0.1% by weight, at least about 0.2% by weight, no greater than about 10% by weight, or even no greater than about 5% by weight.

Part C

The composition can optionally include a component that includes at least two radiation polymerizable functional groups where the functional groups are polymerizable by UV or electron beam radiation, i.e., Part C. The component of Part C can include any level of radiation polymerizable polyfunctionality including mono-, di-, tri-, tetra-, and higher functionality. Suitable examples of components with multiple radiation polymerizable functional groups include (meth)acrylate esters including, e.g., esters of acrylic acid and methacrylic acid prepared from acrylic acid and/or methacrylic acid and aliphatic alcohols, aromatic polyols, aliphatic polyols, cylcoaliphatic polyols, and combinations thereof, (meth)acrylate esters of polyether alcohols, urethane(meth)acrylate oligomers, epoxy(meth)acrylate oligomers, and combinations thereof.

Useful acrylate esters of aliphatic alcohols include, e.g., isobornyl(meth)acrylate, 2-ethoxyethoxy ethyl(meth)acrylate, and combinations thereof. Useful acrylate esters of aliphatic diols include, e.g., neopentyl glycol di(meth)acrylate, 1,6-hexanediol di(meth)-acrylate, trimethylolpropane tri(meth)acrylate, pentaerythritol tetra(meth)acrylate, and (meth)acrylate esters of sorbitol and of other sugar alcohols. These (meth)acrylate esters of aliphatic and cycloaliphatic diols may be modified with an aliphatic ester or with an alkylene oxide. The acrylates modified by an aliphatic ester include, e.g., neopentyl glycol hydroxypivalate di(meth)acrylate, caprolactone-modified neopentyl glycol hydroxypivalate di(meth)acrylates, and combinations thereof. The alkylene oxide-modified acrylate compounds include, e.g., ethylene oxide-modified neopentyl glycol di(meth)acrylates, propylene oxide-modified neopentyl glycol di(meth)acrylates, ethylene oxide-modified 1,6-hexanediol di(meth)acrylates or propylene oxide-modified 1,6-hexanediol di(meth)acrylates, and combinations thereof.

Suitable acrylate monomers derived from polyether polyols include, e.g., neopentyl glycol-modified trimethylolpropane di(meth)acrylates, polyethylene glycol di(meth)acrylates, polypropylene glycol di(meth)acrylates and the like. Trifunctional and higher polyfunctional acrylate monomers include, e.g., trimethylolpropane tri(meth)acrylate, pentaerythritol tri(meth)acrylate, dipentaerythritol tetra(meth)acrylate, dipentaerythritol penta(meth)acrylate, dipentaerythritol hexa(meth)acrylate, caprolactone-modified dipentaerythritol hexa(meth)acrylate, pentaerythritol tetra (meth)acrylate, tris[(meth)acryloxyethyl]isocyanurate, caprolactone-modified tris[(meth)acryloxyethyl]isocyanurates or trimethylolpropane tetra(meth)acrylate, and combinations thereof.

Suitable polyfunctional (meth)acrylate monomers include, e.g., tripropylene glycol diacrylate, neopentyl glycol propoxylate di(meth)acrylate, trimethylolpropane tri (meth)acrylate, and pentaerythritol triacrylate, and combinations thereof.

Other Additives

The composition can also include other additives including, e.g., antioxidants, plasticizers, tackifying agents, adhesion promoters, non-reactive resins, ultraviolet light stabilizers, catalysts, rheology modifiers, biocides, corrosion inhibitors, dehydrators, organic solvents, colorants (e.g., pigments and dyes), fillers, surfactants, flame retardants, waxes, and mixtures thereof. These components, when present, are preferably selected to have limited UV absorption to maximize the amount of light transmitted through the material and available for the photoinitiator molecules to initiate the photopolymerization process.

Suitable plasticizers include, e.g., phthalates, benzoates, sulfonamides, and mixtures thereof, and epoxidized soybean oil. Useful sources of dioctyl and diisodecyl phthalate include those available under the trade designations JAYFLEX DOP and JAYFLEX DIDP from Exxon Chemical. Useful dibenzoates are available under the trade designations BENZOFLEX 9-88, BENZOFLEX 50 and BENZOFLEX 400 from Velsicol Chemical Corporation. Soybean oil is commercially available, e.g., from Union Carbide Corporation under the trade designation FLEXOL EPO.

Plasticizer, when present, is preferably present in the composition in an amount of from about 0.25% by weight to about 10% by weight, no greater than about 5% by weight, no greater than about 3% by weight, or even from about 0.5% by weight to 2% by weight.

Suitable fillers include, e.g., fumed silica, precipitated silica, talc, calcium carbonates, carbon black, alumina silicates, clay, zeolites, ceramics, mica, titanium dioxide, and combinations thereof. When present, the composition preferably includes filler in an amount of at least 0.5% by weight, from about 1% by weight to about 50% by weight, or even from about 5% by weight to about 10% by weight.

The composition can optionally include thermoplastic polymers including e.g., ethylenevinyl acetate, ethyleneacrylic acid, ethylenemethacrylate and ethylene-n-butyl acrylate copolymers, polyvinyl alcohol, hydroxyethylcellulose, hydroxylpropylcellulose, polyvinyl methyl ether, polyethylene oxide, polyvinylpyrrolidone, polyethyloxazolines, starch, cellulose esters, and combinations thereof.

Method of Manufacturing

The composition is well suited for manufacturing laminates. Any suitable method of making laminates can be used. One useful method includes applying adhesive in the liquid state to a film that is to be bonded to form a laminate. The adhesive may be applied using any suitable coating process including, e.g., air knife, trailing blade, spraying, brushing, dipping, doctor blade, roll coating, gravure coating, offset gravure coating, rotogravure coating, and combinations thereof. Useful coating temperatures range from 65° F. to 170° F. The coating weight of the adhesive may vary broadly depending on the properties desired of the laminate. Useful adhesive coating weights include, e.g., from 0.5 pounds (lb) per 3000 square feet ($ft^2$) (i.e., a ream) to about 4 lbs/ream, or even from about 0.5 lbs/ream to 1.5 lbs/ream.

The coated film is then transferred to a radiation zone in which the polymerization reaction, i.e., the crosslinking of the individual components, is initiated by exposing the adhesive composition to ultraviolet radiation (i.e., radiation in the range from about 200 nm to about 400 nm). The adhesive of the invention develops adhesion, for example, contact adhesion, but preferably pressure-sensitive adhesion, by virtue of the radiation and the associated crosslinking reaction of the individual components present in the adhesive. The amount of radiation necessary to cure or partially cure the composition will depend on a variety of factors including, e.g., the angle of exposure to the radiation, the thickness of the coating, the amount of polymerizable groups in the coating composition, and the type and amount of photoinitiator. Typically, a UV light source with a wavelength from about 200 nm to about 400 nm is directed at the adhesive coating that is being transported on a conveyor system that proves a rate of passage past the UV source appropriate for the radiation absorption profile of the composition. Useful sources of UV light include, e.g., extra high pressure mercury lamps, high pressure mercury lamps, medium pressure mercury lamps, low intensity fluorescent lamps, metal halide lamps, microwave powered lamps, xenon lamps, laser beam sources including, e.g., excimer lasers and argon-ion lasers, and combinations thereof.

Following the radiation procedure, the first film coated with the irradiated adhesive composition is contacted with a second film, with or without the application of pressure, to form a laminate. The second substrate may be of the same or different composition relative to the first substrate. The second substrate can be applied to the adhesive by application of pressures and temperatures commonly used in film laminating equipment.

This procedure is particularly advantageous for the mutual adhesive bonding of two films that are impervious to radiation.

The bonding and laminating procedure described may be repeated a number of times, so that it is possible to produce laminates which consist of more than two bonded layers.

Another suitable method of making a laminate includes coating the adhesive composition on a first substrate, contacting the coated adhesive composition with a second substrate, and exposing the adhesive composition or the construction as a whole to radiation. The adhesive composition can be exposed to radiation before, during, after or a combination thereof, contacting the adhesive composition with a second substrate.

Useful substrates include flexible films including, e.g., metal foils (aluminum foil), polymer films and metallized polymer films prepared from polymers including, e.g., polyolefins (e.g., polypropylene, polyethylene, low density polyethylene, linear low density polyethylene, high density polyethylene, polypropylene, and oriented polypropylene; copolymers of polyolefins and other comonomers) metallized polyolefins (e.g., metalized polypropylene), metalized polyether terephthalate, ethylene-vinyl acetates, ethylenemethacrylic acid ionomers, ethylene-vinyl-alcohols, polyesters, e.g. polyethylene terephthalate, polycarbonates, polyamides, e.g. Nylon-6 and Nylon-6,6, polyvinyl chloride, polyvinylidene chloride, cellulosics, and polystyrene, and retortable packaging laminate materials. The thickness of a film may vary, but flexible films typically have a thickness of less than about 0.25 millimeters, e.g. from about 10 micrometers to about 150 micrometers, more typically from about 8 micrometers to about 100 micrometers. The surface of the substrate can be surface treated to enhance adhesion using any suitable method including, e.g., corona treatments, chemical treatments and flame treatments.

Other suitable substrates include, e.g. woven webs, non-woven webs, paper, paperboard, and cellular flexible sheet materials (e.g., polyethylene foam, polyurethane foam and sponge and foam rubber). Woven and non-woven webs can include fibers including, e.g., cotton, polyester, polyolefin, polyamide, and polyimide fibers.

The substrate can be constructed to exhibit many useful properties. Preferably the substrate exhibits properties useful for flexible packaging and retortable packaging. Such properties include, e.g., high tensile strength, vapor barrier properties, flexibility, rigidity, resistance to thermal degradation and combinations thereof.

The invention will now be described by way of the following examples.

EXAMPLES

Test Procedures

Test procedures used in the examples include the following.

% NCO

The isocyanate percentage (i.e., % NCO) present in the adhesive composition is determined by first dissolving the prepolymer in toluene, reacting a predetermined volume of the prepolymer/toluene solution with a predetermined volume of a dibutylamine solution. The amine reacts with the isocyanate groups. The excess amine is then titrated with a predetermined solution of hydrogen chloride. The volume of the hydrogen chloride solution is then used to calculate the % NCO present in the composition.

Viscosity

The viscosity of the adhesive composition is determined at room temperature using a Brookfield Thermosel viscometer with a number 27 spindle.

Peel Adhesion Test Method

The peel force is determined according to ASTM D1876-01 entitled, "Standard Test Method for Peel Resistance of Adhesives," which is incorporated herein. The adhesive is coated on a 1.5 mil thick metallized polyethylene terephthalate film substrate at a coating weight from 1 lbs per ream to 7 lbs per ream. The coated adhesive composition is then exposed to radiation from a medium pressure mercury lamp having a power of 300 watts per inch at a conveyor speed of 100 feet per minute. The partially cured composition is then laminated with the second substrate, a 1.5 mil thick polyethylene film. The peel speed is 12 inches per minute. The results are reported in grams per lineal inch.

Lap Shear Test Method

The lap shear is determined according to ASTM D3163 in which the test specimen is constructed to have 1 mil coating of adhesive on a 2 mil thick polyethylene terephthalate substrate laminated to a second 2 mil thick polyethylene terephthalate substrate with a 1 inch×1 inch substrate overlap. The coated composition is first exposed to radiation from a medium pressure mercury lamp having a power of 300 watts per inch at a conveyor speed of 100 feet per minute. The partially cured composition is then laminated with the second substrate. The Maximum Load is determined and results are reported in units of g/in².

Probe Tack Test Method

The probe tack test is determined by lowering an eight millimeter (mm) diameter spherical probe onto a sample at 100 grams of force for a period of 1 second using an Instron Model 5542 Universal Tester. The sample is a 1 mil thick coating of adhesive on a 2 mil thick PET film substrate. The probe is then withdrawn at a rate of 1000 mm/second. The force that it takes to pull the probe off the adhesive is referred to the "Pull Off" force. The maximum Pull Off force is measured and reported in units of g/in².

Examples 1-8

Part A is prepared by charging DESMOPHEN S-1011-210 polyester polyol (Bayer Corporation, Pittsburg, Pa.) to a reactor and heating to 130° F. A nitrogen purge is started and continued during the process. LUPRANATE MI monomeric 2,4'-diphenylmethane diisocyanate (MDI) (BASF Corporation, Syandotte, Mich.) is then added to the reactor in an amount sufficient to achieve at a stoichiometric NCO/OH ratio of from 2/1 (NCO/OH) to 2.5/1 (NCO/OH). The mixture is agitated and the temperature is raised to from 160° F. to 170° F. The reaction is complete in from one to two hours. The % NCO is checked periodically to determine if the reaction is complete, i.e., the target % NCO is obtained. The agitation is then stopped and 2-hydroxyethyl acrylate (HEA) (Dow Chemical Company, Midland, Mich.) is added to the reactor and allowed to react while maintaining the temperature from 160° F. to 170° F. The second reaction is complete in from 1 to 2 hours. The % NCO is checked to determine if the reaction is complete. The agitation is then stopped and additional LUPRANATE MI monomeric MDI is added to the reactor. The agitation is then restarted and continued until the mixture is homogeneous. The amounts of polyester polyol, MDI, and HEA used in Part A are set forth in Table 1.

Part B is prepared by combining 97.5% DESMOPHEN XF-7395-200 polyester polyol with a hydroxyl number of approximately 200 and 2.5% DAROCUR 1173 photoinitiator.

Part A is mixed with Part B to provide a stoichiometric ratio of NCO:OH of 1.4:1.0.

The adhesive composition is then coated on a 1.5 mil thick metallized polyethylene terephthalate film substrate at a coating weight of 1 lb per ream. The coated adhesive composition is then exposed to radiation from a medium pressure mercury lamp having a power of 300 watts per inch at a conveyor speed of 100 feet per minute. The partially cured composition is then laminated with the second substrate, a 1.5 mil thick polyethylene film.

The expected viscosity at 70° F., and peel strength at 0 minutes, 24 hours, and 48 hours, of the adhesive compositions of Examples 1-8 are set forth in Table 1 below.

TABLE 1

| Component | Example 1 | Example 2 | Example 3 | Example 4 | Example 5 | Example 6 | Example 7 | Example 8 |
| --- | --- | --- | --- | --- | --- | --- | --- | --- |
| Polyester polyol (g) | 50 | 50 | 50 | 50 | 50 | 50 | 50 | 50 |
| MDI (g) | 70 | 70 | 80 | 80 | 80 | 70 | 70 | 70 |
| HEA (g) | 10 | 20 | 20 | 36 | 25 | 15 | 17 | 17 |
| Second Charge of MDI (g) | 73 | 110 | 100 | 155 | 115 | 90 | 75 | 60 |
| NCO# (Theoretical) | 18 | 18 | 18 | 18 | 18 | 18 | 16.36 | 15 |
| Viscosity at 70° F. | 5100 | 3500 | 4100 | 3700 | 4600 | 4000 | 8700 | 13,600 |
| Peel Force at 0 hours (g/lineal inch) | 20 no cohesive failure | 38 cohesive failure | 30 cohesive failure | 18 Sample is over cured and does not have tack | 34 cohesive failure | 18 more cohesive failure relative to Example 1 | 30 cohesive failure | 45 cohesive failure |

TABLE 1-continued

| Component | Example 1 | Example 2 | Example 3 | Example 4 | Example 5 | Example 6 | Example 7 | Example 8 |
|---|---|---|---|---|---|---|---|---|
| Peel Force at 24 hours (g/lineal inch) | Destruct | Destruct | Destruct | Destruct | Destruct | Destruct | Destruct | Destruct |
| Peel Force at 48 hours (g/lineal inch) | Destruct | Destruct | Destruct | Destruct | Destruct | Destruct | Destruct | Destruct |

The adhesive composition of Example 1 is tested according to the Lap Shear and Probe Tack Test Methods. The expected results are reported in Table 2.

TABLE 2

| Test | Before UV Irradiation | After UV Irradiation |
|---|---|---|
| Lap Shear (g/in$^2$) | 22.44 | 833.21 |
| Probe Tack (g/in$^2$) | 6.04 | 32.38 |

Comparative Example 1

Part A is prepared as follows. RUCOFLEX 1011-210 polyester polyol in an amount of 46.5 g is charged to a reactor and heated to 130° F. A nitrogen purge is started and continued during the process. LUPRANATE MI monomeric 2,4'-diphenylmethane diisocyanate (MDI) (BASF Corporation, Syandotte, Mich.) in an amount of 46.5 g is then added to the reactor. The mixture is agitated and the temperature is raised to from 160° F. to 170° F. The reaction is complete in from one to two hours. The % NCO is checked periodically to determine if the reaction is complete. The agitation is then stopped, the temperature is lowered to 140° F., and 7 g 2-hydroxyethyl acrylate (Dow Chemical Company, Midland, Mich.) is added to the reactor and allowed to react while maintaining the temperature from 160° F. to 170° F. The second reaction is complete in from 1 to 2 hours. The % NCO is checked to determine if the reaction is complete. The agitation is then stopped. The resulting composition is expected to have a viscosity of 11,470 centipoises at 140° F.

Example 9

Part A is prepared as follows. RUCOFLEX 1011-210 polyester polyol in an amount of 41.5 g is charged to a reactor and heated to 130° F. A nitrogen purge is started and continued during the process. LUPRANATE MI monomeric 2,4'-diphenylmethane diisocyanate (MDI) (BASF Corporation, Syandotte, Mich.) in an amount of 41.5 g is then added to the reactor. The mixture is agitated and the temperature is raised to from 160° F. to 170° F. The reaction is complete in from one to two hours. The % NCO is checked periodically to determine if the reaction is complete. The agitation is then stopped, the temperature is lowered to 140° F., and 8 g 2-hydroxyethyl acrylate (HEA) (Dow Chemical Company, Midland, Mich.) is added to the reactor and allowed to react while maintaining the temperature from 160° F. to 170° F. The second reaction is complete in from 1 hour to 2 hours. The % NCO is checked to determine if the reaction is complete. The agitation is then stopped and 9 g of additional LUPRANATE MI monomeric MDI is added to the reactor. The agitation is then restarted and continued until the mixture is homogeneous.

The composition is expected to have a viscosity of 6037 centipoises at 140° F.

Part A of Example 9 and Part A of Comparative Example 1 are each combined with Part B of Examples 1-8 to provide a stoichiometric ratio of NCO:OH of 1.4:1.0. The adhesives are then coated on a 1.5 mil thick metallized polyethylene terephthalate film substrates at a coating weight of 1 lb per ream. The coated adhesive compositions are then exposed to radiation from a medium pressure mercury lamp having a power of 300 watts per inch at a conveyor speed of 100 feet per minute. The partially cured compositions are then laminated with a second substrate, a 1.5 mil thick polyethylene film. The samples are then tested according to the Peel Adhesion Test Method. The expected results are reported in Table 3.

TABLE 3

| Peel Force (g/lineal inch) | Comparative Example 1 | Example 9 |
|---|---|---|
| At 0 Minutes | 26 | 18 |
| At 24 hours | 310 | Destruct |

Example 10

A number of laminate constructions are prepared using the adhesive composition of Example 8. The laminates are prepared by coating the adhesive composition of Example 8 on a first substrate, contacting the coated adhesive composition with a second substrate, bonding the second substrate to the first substrate through the adhesive composition, and exposing the coated adhesive composition to UV radiation at a power of 300 watts/inch at a rate of 100 feet per minute through one of the substrates. The peel force is measured according to the Peel Adhesion Test Method. The substrates and the expected results are reported in Table 4.

Control 1

A number of laminate constructions are prepared using the adhesive composition of Example 8. The laminates are prepared by coating the adhesive composition of Example 8 on a first substrate, contacting the coated adhesive composition with a second substrate, and bonding the second substrate to the first substrate through the adhesive composition. The laminate is then stored at ambient conditions. The peel force is measured according to the Peel Adhesion Test Method. The substrates and the expected results are reported in Table 4.

TABLE 4

| Laminate | Curing | First Substrate | Second Substrate | Coating Weight (lbs/ream) | 0 hours (g/lineal inch) | 3.5 hours (g/lineal inch) | 6 hours (g/lineal inch) | 24 hours (g/lineal inch) |
|---|---|---|---|---|---|---|---|---|
| Example 10 | UV | Paper | 0.5 mil PP | 1.5 | 25 | Destruct | Destruct | Destruct |
| Example 10 | UV | 1 mil PE[1] | 0.5 mil PP[2] | 1 | 30 | Destruct | Destruct | Destruct |
| Example 10 | UV | Coated paper | 0.5 mil PP | 1.5 | 0 | 20 (fiber tear) | Destruct | Destruct |
| Control 1 | Ambient | Paper | 0.5 mil PP | 1.5 | 0 | 20 | 100 | Destruct |
| Control 1 | Ambient | PE | 0.5 mil PP | 1 | 0 | 20 | 165 | Destruct |
| Control 1 | Ambient | Coated paper | 0.5 mil PP | 1.5 | 0 | 0 | 20 (fiber tear) | Destruct |

Other embodiments are within the claims.

All of the patents and patent applications cited herein are incorporated herein, in total, by reference.

What is claimed is:

1. A method of making a laminate, said method comprising:
 a) preparing an adhesive composition, said preparing comprising combining
  a first part comprising
   (meth)acrylate functional, polyisocyanate prepolymer, and
   polyisocyanate monomer,
   said first part comprising at least 10% by weight isocyanate functional groups,
  a second part comprising polyol, and
  optionally, a third part,
  at least one of said first part, said second part and said optional third part comprising photoinitiator;
 b) coating a first flexible substrate with said adhesive composition;
 c) exposing the adhesive composition to radiation to partially cure said adhesive composition; and
 d) contacting said adhesive composition with a second flexible substrate.

2. The method of claim 1, wherein said first part comprises at least 15% by weight said polyisocyanate monomer.

3. The method of claim 1, wherein said first part comprises at least 30% by weight said polyisocyanate monomer.

4. The method of claim 1, wherein said exposing occurs prior to contacting said adhesive composition with said second flexible substrate.

5. The method of claim 1, wherein said exposing occurs after contacting said adhesive composition with said second flexible substrate.

6. The method of claim 1, wherein said adhesive composition exhibits a viscosity of from 250 centipoise to 5000 centipoise at a temperature from 65° F. to 170° F.

7. The method of claim 1, wherein said coating comprises coating said adhesive composition at a coating weight of from 0.5 pounds per 3000 square feet to 4 pounds per 3000 square feet.

8. The method of claim 1, wherein said adhesive composition exhibits a lap shear strength of at least 25 g/in$^2$ after exposure to said radiation.

9. The method of claim 1, wherein said adhesive composition exhibits a lap shear strength of at least 100 g/in$^2$ after exposure to said radiation.

10. The method of claim 1, wherein said adhesive composition comprises
 from 5% by weight to 70% by weight said (meth)acrylate functional, polyisocyanate prepolymer;
 at least 7% by weight said polyisocyanate monomer;
 from 30% by weight to 95% by weight said polyol; and
 from 0.2% by weight to 10% by weight said photoinitiator.

11. The method of claim 1, wherein said first part of said adhesive composition comprises
 from 40% by weight to 90% by weight said (meth)acrylate functional, polyisocyanate prepolymer, and
 from 10% by weight to 60% by weight said polyisocyanate monomer.

12. The method of claim 1, wherein said first part of said adhesive composition comprises from 10% by weight to about 20% by weight isocyanate functional groups.

13. The method of claim 1, wherein said first part comprises from about 0.5% by weight to about 20% by weight radiation polymerizable groups.

14. The method of claim 1, wherein said first part comprises from about 1% by weight to about 10% by weight radiation polymerizable groups.

15. The method of claim 1, wherein the first part and the second part are combined in amounts such that the stoichiometric ratio of isocyanate (NCO) to hydroxyl group (OH) (NCO:OH) is from about 1:1 to about 2:1.

16. The method of claim 1, wherein said (meth)acrylate polyisocyanate prepolymer comprises the reaction product of
 a) an isocyanate polyurethane prepolymer comprising the reaction product of
  i) polyol and
  ii) isocyanate; and
 b) hydroxy functional (meth)acrylate.

17. The method of claim 16, wherein said hydroxy functional acrylate comprises hydroxyalkyl(meth)acrylate.

18. The method of claim 16, wherein said hydroxy functional acrylate comprises hydroxyethyl acrylate.

19. The method of claim 1, wherein said polyol comprises polyester polyol, polyether polyol, or a mixture thereof.

20. The method of claim 1, wherein said polyol has a functionality of at least 2.

21. The method of claim 1, wherein said polyol has a functionality of no greater than 3.

22. The method of claim 1, wherein said adhesive composition comprises from 20% by weight to 95% by weight said polyol.

23. The method of claim 1, wherein said adhesive composition comprises from 30% by weight to 70% by weight said polyol.

24. The method of claim 1, wherein said adhesive composition comprises from 30% by weight to 70% by weight said (meth)acrylate functional, polyisocyanate prepolymer.

25. The method of claim 1, wherein said adhesive composition comprises from 20% by weight to 60% by weight said (meth)acrylate functional, polyisocyanate prepolymer.

26. The method of claim 1, wherein said photoinitiator is selected from the group consisting of dialkoxy acetophenones, hydroxyalkyl phenyl ketones, benzoin ethers, benzoin acetals, acyl phosphine oxides, and combinations thereof.

27. The method of claim 1, wherein said photoinitiator comprises a hydroxyl functional photoinitiator.

28. The method of claim 1, wherein at least one of said first and second flexible substrates is a polymer film.

29. The method of claim 1, wherein at least one of said first and second flexible substrates is a metallized polymer film.

30. The method of claim 1, wherein at least one of said first flexible substrate and said second flexible substrate comprises polyethylene terephthalate, polypropylene, polyethylene, metallized polypropylene, metalized polyethylene terephthalate, Nylon, and metal foil.

31. A method of making a laminate, said method comprising:
a) coating a first flexible substrate with a composition comprising
(meth)acrylate functional, polyisocyanate prepolymer,
at least 7% by weight polyisocyanate monomer,
polyol, and
photoinitiator;
b) exposing said adhesive composition to radiation to partially cure said adhesive composition; and
c) contacting said adhesive composition with a second flexible substrate.

32. A method of making a laminate, said method comprising:
a) preparing an adhesive composition, said preparing comprising combining
a first part comprising
(meth)acrylate functional, polyisocyanate prepolymer, and
at least 15% by weight polyisocyanate monomer,
a second part comprising polyol, and
optionally, a third part,
at least one of said first part, said second part and said optional third part comprising photoinitiator;
b) coating a first flexible substrate with said adhesive composition
c) exposing said composition to radiation to partially cure said composition; and
d) contacting said adhesive composition with a second flexible substrate.

33. A method of making a laminate, said method comprising:
a) preparing an adhesive composition, said preparing comprising combining
(meth)acrylate functional, polyisocyanate prepolymer,
polyisocyanate monomer,
the combination of said prepolymer and said monomer comprising
at least 10% by weight isocyanate functional groups based on the combined weight of said prepolymer and said polyisocyanate monomer,
polyol, and
photoinitiator;
b) coating a first flexible substrate with said adhesive composition;
c) exposing the adhesive composition to radiation to partially cure said adhesive composition; and
d) contacting said adhesive composition with a second flexible substrate.

34. A laminate comprising:
an adhesive composition comprising the reaction product of
(meth)acrylate functional, polyisocyanate prepolymer,
polyisocyanate monomer,
the combination of said prepolymer and said monomer comprising at least 10% by weight isocyanate functional groups based on the combined weight of said prepolymer and said polyisocyanate monomer,
polyol, and
photoinitiator;
a first flexible substrate; and
a second flexible substrate,
said first flexible substrate being bonded to said flexible substrate through said adhesive composition.

35. A laminate comprising:
an adhesive composition comprising the reaction product of
a (meth)acrylate functional, polyisocyanate prepolymer,
polyisocyanate monomer,
polyol, and
photoinitiator,
a first flexible substrate; and
a second flexible substrate,
said first flexible substrate being bonded to said second flexible substrate through said adhesive composition,
said adhesive composition exhibiting a destructive peel to at least one of said first and second substrates.

36. A package comprising:
a) a food article; and
b) the laminate of claim 34 at least partially surrounding said food article.

* * * * *